US009717353B1

(12) United States Patent
Borra

(10) Patent No.: US 9,717,353 B1
(45) Date of Patent: Aug. 1, 2017

(54) ADAPTABLE MOUNTING SYSTEM FOR PHONOGRAPH RECORDS AND/OR VARIOUS PLANAR OBJECTS

(71) Applicant: Brian Martin Borra, Seattle, WA (US)

(72) Inventor: Brian Martin Borra, Seattle, WA (US)

(73) Assignee: Brian Borra, Seattle, WA (US)

( * ) Notice: Subject to any disclaimer, the term of this patent is extended or adjusted under 35 U.S.C. 154(b) by 17 days.

(21) Appl. No.: 14/989,817

(22) Filed: Jan. 7, 2016

(51) Int. Cl.

| | |
|---|---|
| ***A47G 29/02*** | (2006.01) |
| ***A47G 1/17*** | (2006.01) |
| ***A47G 1/16*** | (2006.01) |
| ***F16M 13/02*** | (2006.01) |
| ***A47G 1/06*** | (2006.01) |

(52) U.S. Cl.
CPC ................. *A47G 1/17* (2013.01); *A47G 1/06* (2013.01); *A47G 1/164* (2013.01); *F16M 13/02* (2013.01); *A47G 2001/0672* (2013.01)

(58) Field of Classification Search
CPC .......... A47G 1/215; A47G 1/10; A47G 1/065; A47F 7/0057; G11B 33/0472; G09F 1/10
See application file for complete search history.

(56) References Cited

U.S. PATENT DOCUMENTS

| | | | | |
|---|---|---|---|---|
| 564,586 A | 7/1896 | Berliner | | |
| 2,663,416 A | 12/1953 | Hirsch | | |
| 2,951,668 A * | 9/1960 | Peterka | A47G 1/215 | 248/466 |
| 3,049,323 A * | 8/1962 | Peterka | A47G 1/215 | 248/201 |
| 3,107,783 A * | 10/1963 | Corey | B65D 85/544 | 206/310 |
| 3,721,030 A * | 3/1973 | Steinhardt | A47G 1/10 | 40/780 |
| 3,854,259 A * | 12/1974 | Lechene | E04B 1/6112 | 248/460 |
| 4,041,630 A | 8/1977 | Holbrook | | |
| 4,258,488 A | 3/1981 | Schienbein | | |
| 4,290,530 A | 9/1981 | Wooster | | |
| 4,497,125 A * | 2/1985 | Hutchinson | G09F 1/10 | 211/40 |
| 4,499,994 A | 2/1985 | Rentch | | |
| 4,578,886 A | 4/1986 | Lofredo | | |
| 4,673,152 A * | 6/1987 | Brown | A47G 1/215 | 211/40 |
| 4,858,875 A * | 8/1989 | Nielsen | A47G 1/215 | 248/201 |
| 5,397,092 A * | 3/1995 | Black | A47G 1/215 | 248/490 |

(Continued)

*Primary Examiner* — Bradley Duckworth

(57) ABSTRACT

In accordance with one embodiment, I presently contemplate a cruciform support base (20), semi-circular dial (10), and concentric semi-circular brace (16) that work together to support the corner of a record and/or planar article. The dial (10) and brace (16) are fastened to the support base (20) and machined in such a way that they form a simple, economical, and adaptable mechanical unit (24). Once paired with a minimum number of units, and mounted to a wall, they cooperate to display any number of records, planar articles, and/or combination thereof in an attractive, tight, grid-like configuration. Furthermore, the design of this system also allows for any one record and/or planar article to be easily retrieved or stored with the swipe of a finger.

6 Claims, 2 Drawing Sheets

(56) References Cited

U.S. PATENT DOCUMENTS

| | | | | |
|---|---|---|---|---|
| 5,671,852 | A * | 9/1997 | Maharg | A47F 5/0815<br>211/182 |
| 6,070,721 | A | 6/2000 | Levitan | |
| 6,729,591 | B2 * | 5/2004 | Hsu | G09F 7/04<br>248/205.6 |
| 7,908,718 | B2 * | 3/2011 | Glasser | A47G 1/16<br>24/335 |
| 7,934,331 | B2 * | 5/2011 | Zlotocha | A47G 1/16<br>40/735 |
| 7,980,527 | B2 * | 7/2011 | Gronvall | B02C 17/22<br>241/182 |
| 8,261,463 | B2 * | 9/2012 | Trisko | B43L 9/04<br>33/562 |
| 9,532,670 | B2 * | 1/2017 | Vaessen | A47G 1/1606 |
| 2005/0029133 | A1 * | 2/2005 | Maehashi | G11B 33/0422<br>206/308.1 |
| 2005/0102804 | A1 * | 5/2005 | Glasser | A47G 1/16<br>24/545 |
| 2005/0223611 | A1 * | 10/2005 | Dennis | A47G 1/065<br>40/729 |
| 2016/0345754 | A1 * | 12/2016 | Hogrefe | F16M 13/02 |

* cited by examiner

ADAPTABLE MOUNTING SYSTEM FOR PHONOGRAPH RECORDS AND/OR VARIOUS PLANAR OBJECTS

BACKGROUND—PRIOR ART

Wall mounted frames provide a method for showcasing and storing planar articles. Specifically, these frames provide room decoration, openly displaying collections of a particular artist, genre, taste, or rarity and protection from damage or improper storing. Typically multiple articles are positioned in a grid-like fashion to achieve a collage effect.

Previous display frames for phonograph records, or like planar articles, lack the ability to efficiently remove, insert, and display items one wishes to access; this embodiment permits all of these operations with a single, novel and adaptable mechanism. This was the motivation behind this invention; I couldn't find anything that suited these requirements.

Many prior art patents exist, as the first phonographic record is over 100 years old (U.S. Pat. No. 564,586-1896), but such display frames do not provide a solution as adaptable, simple, and economical as the ensuing embodiment herein. Below is a table of applicable prior art discovered by a thorough patentability search.

PRIOR ART U.S. PATENTS

| U.S. Pat. No. | Code | Issue/Publication Date | Patentee |
|---|---|---|---|
| 2,663,416 | B1 | Dec. 22, 1953 | Hirsch |
| 3,107,783 | B1 | Aug. 22, 1963 | Corey et al. |
| 4,041,630 | B1 | Aug. 16, 1977 | Holbrook |
| 4,258,488 | B1 | Mar. 31, 1981 | Schienben |
| 4,290,530 | B1 | Sep. 22, 1981 | Wooster |
| **4,497,125** | **B1** | **Feb. 5, 1985** | **Hutchinson** |
| 4,499,994 | B1 | Feb. 19, 1985 | Rentch |
| 4,578,886 | B1 | Apr. 1, 1986 | Lofredo |
| **4,673,152** | **B1** | **Jun. 16, 1987** | **Brown** |
| **4,858,875** | **B1** | **Aug. 22, 1989** | **Nielsen** |
| 6,070,721 | B1 | Jun. 6, 2000 | Levitan |

The bold patents listed in the previous table bear the closest relation to the primary embodiment herein and are emphasized for the reviewer's convenience; these patents are explained thoroughly in the ensuing bulleted list and the paragraphs immediately succeeding it will jointly address the remaining patents with a lesser relation to the primary embodiment herein.

U.S. Pat. No. 4,497,125 to Hutchinson-1985

This patent resembles the intent of the embodiment herein. A plurality of records may be mounted to a wall using a series of square[1] blocks that are machined with carefully designed channels which are positioned at the vertices of a grid of records. These blocks require the record to be slid in from the top through a channel the depth of the block. There is no motion to this device, specifically no articulation to latch a record in position and furthermore, each record, or planar article, rests at an angle to the wall, not parallel to the wall. Also, if milled from a block of material, this device consists of some precisely square and angled grooves which would be difficult to construct, leading to higher manufacturing cost. This patent was issued in 1985 and is over 20 years old.

[1] The drawings depict a square and a circle and the specification notes that the shape is not critical to the invention.

U.S. Pat. No. 4,673,152 to Brown-1987

This patent also resembles the intent of the embodiment herein. A plurality of records may be mounted to a wall using a combination of cross and elbow shaped pieces that consist of specially molded recesses/ridges which are positioned at the vertices of a grid of records. This device is motionless and attached to a wall by a single nail. The downside of this design is that the hole which receives the nail can easily be worn due to repetitive use, especially in drywall which is a common residential wall material, leading to a failure of the display and removal objectives of the device. This device is also not adaptable, in that separate elbow and cross pieces are needed to constrain corners and intersections respectively; also when any one of these pieces are removed there is nothing left to support the record, so it will immediately fall, potentially damaging it. This patent was issued in 1987 and is over 20 years old.

U.S. Pat. No. 4,858,875 to Nielsen-1989

While this device was not created to hold phonograph records, it shares a semblance to the embodiment herein. It is a pocket-like holder "for mirrors and similar elements [that] includes a base element and a plurality of holding members, with the base element being adapted, by breaking along the weakening lines formed by a cross-shaped recess . . . and with a shape corresponding to the shape of the holding members being provided with locking pins for the introduction into locking holes of the base element of the sections which are furthermore provided with fixing holes." The constraining method is motionless and may be attached to the wall through its "fixing holes" with a pan-head screw. Mirrors and similar elements are latched to the base element by the friction fit of a "locking pin." Also, as with U.S. Pat. No. 4,673,152 to Brown (1987), when any one of the "holding members" are removed there is nothing left to support the displayed element, so it will immediately fall, potentially damaging once held articles. Coincidentally, and unknown to me until my patentability search, this device utilizes a similar adaptable base concept whereby breaking along "weakening lines" of a single unit allows for multiple shapes to support both corners and intersections for a grid of display elements. This patent was issued in 1989 and is over 20 years old.

The remaining (non-bolded) prior-art patents from the previous table may be characterized as either fully constrained, picture-frame-like display cases from U.S. Pat. No. 3,107,783 to Corey et al (1963); U.S. Pat. No. 4,041,630 to Holbrook (1977); U.S. Pat. No. 4,258,488 to Schienben (1981); U.S. Pat. No. 4,290,530 to Wooster (1981); U.S. Pat. No. 4,578,886 to Lofredo (1986); or U.S. Pat. No. 6,070,721 to Levitan (2000) or phonograph-only display cases from U.S. Pat. No. 2,663,416 to Hirsch (1953) and U.S. Pat. No. 4,499,994 to Rentch (1985).

Picture frame-like display cases constrain a record on all six sides by support members spanning the dimensions of the record with either an open or transparent face for viewing and an opposing face that permits attachment to a wall. The common mode of operation is to slide a record into and/or out of the aforementioned structure. Phonograph-only display cases do not attempt to store the record sleeve. A phonograph record is constrained by a shaft that protrudes into the center of a record which is mounted to a larger recessed base that is connected to a frame and protective face.

Both categories of these less-in-common prior-art patents do not integrate with one-another to create a decorative collage of records. This is a hindrance because one cannot mount multiple records in a tight grid-like fashion, specifically the width or height of a record, and conveniently slide records in and out for immediate play; one must un-mount the entire unit from the wall and further operate a mechanism to retrieve an article. They are also fixed dimensionally, permitting only phonograph records or planar articles the size of a phonograph record and/or sleeve to be displayed. These prior art record mounts are more suited for archival of records, rather than frequent playing.

SUMMARY

In accordance with one embodiment, I presently contemplate an adaptable wall mounted framing system for showcasing and retrieving records and/or planar articles.

Advantages

Accordingly several advantages of one or more aspects are as follows:

(a) Adaptable

The embodiment herein operates through a cooperative design methodology wherein adjacent identical units assist in the restraint of each planar article. Any number of planar articles may be displayed; each assembled unit offers the ability to form a grid-like system of varying scale, only limited by the size of the surface to which it is mounted. In addition to quantity, a multitude of different sizes of planar articles, not just 12"×12" records, nor identically sized articles, may be displayed based on installation.

(b) Simple

The embodiment provides a simple solution, to remove, secure, and replace planar articles unlike prior art. It features a novel mechanism whereby the swipe of a single finger effectively removes one of the mounting constraints; unlocking two adjacent mechanisms permits removal of any planar article in the display "grid." Conversely, locking of any planar article parallel to its mounting surface is performed by the same single swipe of a finger through the same adjacent mechanisms. This ability to retrieve and store desired work in a simple manner lends itself to commercial application, such as a merchandise display, where immediate access is preferred at purchase. Additionally, simple access is also preferred for personal use, under circumstances of frequent record playing.

(c) Economical

Each component features score, or weakening, lines that allow for reconfiguration of an assembly, based on location within the grid. One unit will work for any type of grid vertex therefore only one shape needs to be manufactured, thereby driving repeatability and increasing speed in the manufacturing workflow. The effect is lower cost of production as well as an increase in consistency.

Another benefit of the embodiment I presently contemplate, is the two dimensional manufacturing process using flat raw stock/material. As with the benefit of manufacturing only one shape, production costs will be significantly cheaper than having to mill a block of material and/or perform a lengthy manufacturing procedure.

Thus several advantages of one or more aspects are that the embodiment is adaptable, simple, and economical. Other advantages of one or more aspects will become apparent from a consideration of the ensuing description and accompanying drawings.

DRAWINGS—FIGURES

REFERENCE NUMERALS

Figure 1:
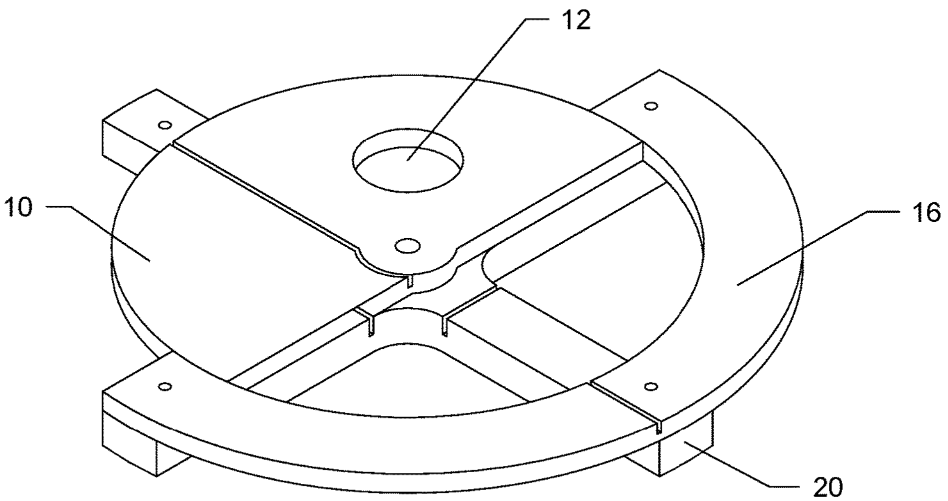
FIG. 1 is a perspective view of a first embodiment of an assembled unit.

10 inner retaining dial
12 gripping point
14 center hole
16 outer retaining ring
18 mounting hole(s)
20 support base
22 weakening cut(s)
24 fully assembled unit
26 ¾ adapted base with 16 only
28 ¾ adapted base with 10 only
30 ¾ adapted base with both 10 and 16
32 ½ adapted base with 16 only
34 ½ adapted base with 10 only
40 square planar article
42 non-square planar article

DETAILED DESCRIPTION—FIRST EMBODIMENT—FIGS. 1-3

Figure 3:
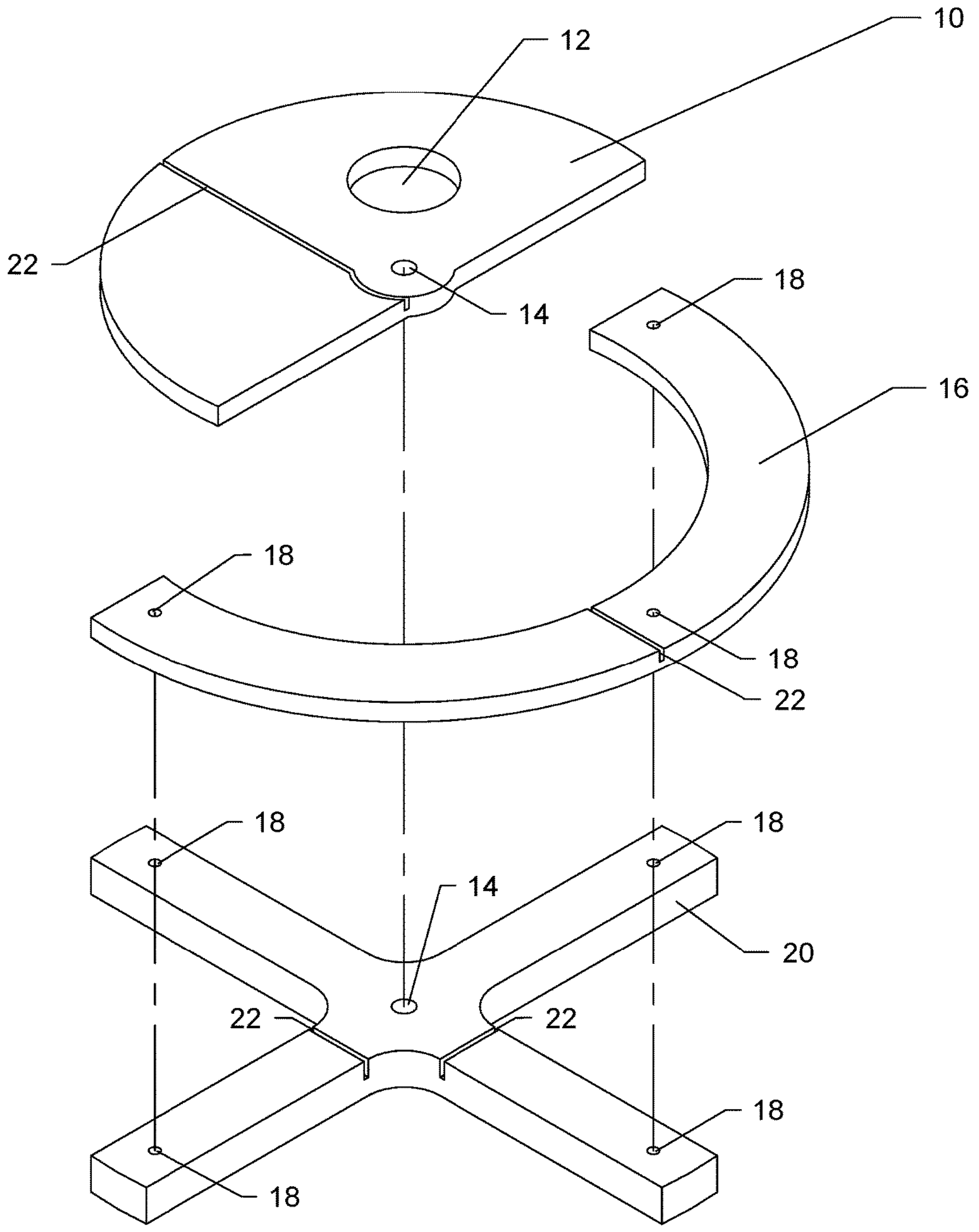
FIG. 3 is an exploded view of FIG. 1, allowing the reader to understand the mechanics of the assembled unit.

One embodiment of an assembled unit is illustrated in FIG. 1 (perspective view) and FIG. 3 (exploded view). I presently anticipate a fully assembled unit 24, or variant thereof 26 28 30 32 34, contains (1) a support base 20 of uniform thickness and cruciform shape with mounting holes 18, axially located center hole 14, and scoring lines or weakening cuts 22 half the depth of the base; (2) an outer retaining ring 16 of uniform thickness and semi-circle shape with mounting holes 18 coincident with the mounting hole locations of the support base 20 and weakening cuts 22 half the depth of the outer retaining ring; and (3) an inner retaining dial 10 of uniform thickness and semi-circle shape with axially located center hole 14, weakening cuts 22 half the depth of the inner retaining dial, and gripping point 12 the diameter of an average sized index finger.

I presently contemplate that the support base 20, outer retaining ring 16, and inner retaining dial 10 in this first embodiment be made of a rigid plastic, specifically polymethyl methacrylate (PMMA), but other materials, such as wood or metal, are also suitable. Ideally the material is translucent, especially important for reference numerals 10 and 16, so that album artwork is not obscured at its corners.

The support base's 20 typical diameter is 3 inches and typical thickness is that of an average record sleeve, anywhere from 0.25 inches for a single LP to 0.375 inches for a double LP, however it is not limited to either of these dimensions, as any planar article may be substituted for which these dimensions could scale by a factor proportional to the planar article's size. The outer retaining ring 16 and inner retaining dial 10 dimensions are tied to the support base's diameter, and only need to be as thick as necessary to securely constrain a record or planar article.

I presently contemplate that the support base 20, outer retaining ring 16, and inner retaining dial 10 in this first embodiment be jointed together by a self-tapping screw through center hole 14. Assembled units 24 26 28 30 32 34 may then be attached to a wall by nails through the mounting holes 18 of length more than the thickness of 20 and 16 combined, such that a secure connection may be made between the assembled unit 24 26 28 30 32 34 and its mounting surface. However, this mounting technique is not the only one conceivable, if the mounting surface were magnetized, by magnetic paint for instance, opposing magnets could be inset into the support base 20 and mounting holes 18 could be removed, wherein the outer retaining ring 16 could be glued to the support base 20. Alternatively, double-sided adhesive material could be applied between the assembled unit 24 26 28 30 32 34 and its mounting surface. There are many options for mounting to wallboard of various materials; the embodiment herein could easily be modified to accommodate any mounting substrate.

Operation-First Embodiment

At present I believe that this embodiment operates most efficiently, but the other embodiments are also satisfactory.

The inner retaining/semi-circular dial 10 is allowed to pivot about the center hole 14 allowing two modes of constraint—fixed or free. This action is initiated by the user, wherein one places their finger into gripping point 12 and rotates inner retaining dial 10 into either fixed or free position. In order for rotational operation to be achieved, the self-tapping screw through center hole 14 should be set to the correct torque, such that the inner retaining dial 10 is allowed to rotate about center hole 14. If the self-tapping screw is too tight, the inner retaining dial 10 won't be able to spin, if too loose, the dial won't stay at its last position or worse won't securely constrain a planar article.

It takes four of the adapted assembled units, two of 32 and two of 34, to support all four corners of a single record/square planar article 40 or single non-square planar article 42. These adapted assembled units may be derived from a fully assembled unit 24, by snapping-off two of support base 20's arms along its weakening lines 22, snapping the outer retaining ring 16 in half along its weakening line 22, and snapping the inner retaining dial 10 in half along its weakening line 22, thereby changing the once cruciform shaped support base 20 and it's child components into an "L" shape.

Figure 2:
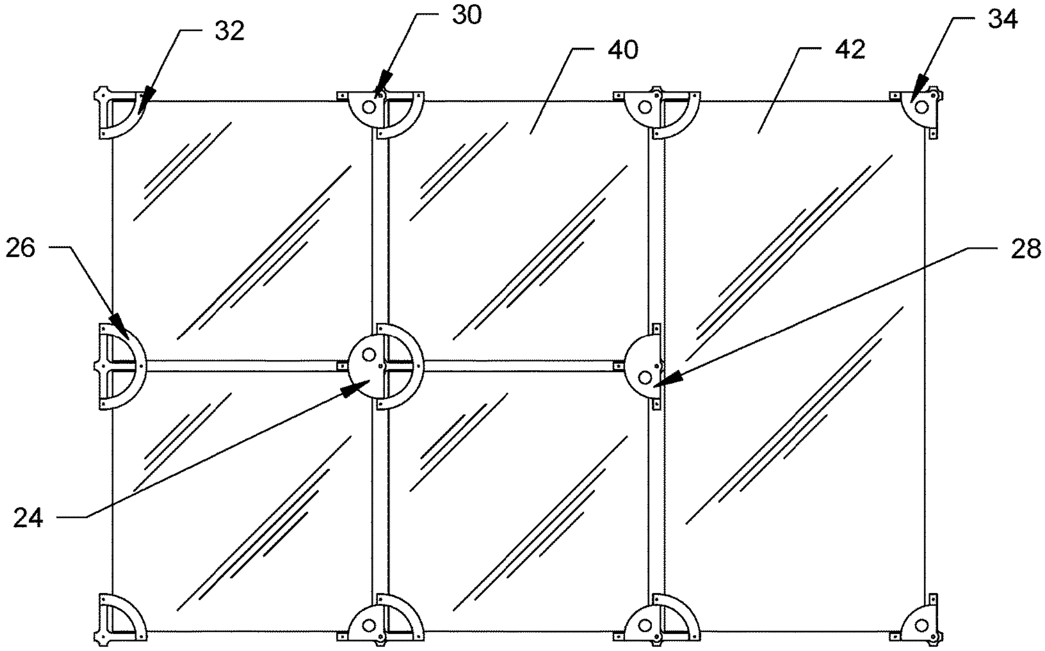
FIG. 2 is a front-view of a multitude of assembled units aligned in a grid, placed at the vertices of various planar articles.

If it is desired to display more than one planar article, more than four fully assembled units 24 may be reconfigured along their weakening lines 22 in order to create a collage of planar articles as illustrated by FIG. 2 and adapted assembled units 26 28 30 32 34. This exhibits the adaptability of the present embodiment, along with the cooperative nature that exists between assembled units.

CONCLUSION, RAMIFICATIONS, AND SCOPE

Thus the reader will see that, according to one embodiment of the invention, I have provided a more economical, simple, and adaptable device that can be used not only for phonographic records, but a multitude of planar articles of varying size. In addition, planar articles may be removed and inserted as much as one desires, allowing for either a dynamic or static collection of articles.

While the above description contains many specificities, these should not be construed as limitations on the scope of any embodiment, but rather as exemplifications of various embodiments thereof. Many other ramifications and variations are possible within the teachings of the various embodiments. For example, an alternative fastening technique for base unit attachment to its surface, a different material, shape for components, or a unique display configuration other than a grid—say a pattern of letters or a simple shape.

Thus the scope of the Invention should be determined by the appended claims and their legal equivalents, and not by the examples given.

The invention claimed is:

1. An adaptable mounting system for various planar objects, comprising:

a) a plurality of base elements for fixation to a wall surface and having recesses for support of a plurality of planar articles, b) a plurality of approximately semi-circular static holding members fixed to the base elements and covering the recesses for securing the corners of said planar articles, c) a plurality of approximately semi-circular dynamic holding members covering the recesses of the base element for securing the corners of said planar articles, d) wherein said base element, said static holding member, and said dynamic holding members have weakening lines, so that said base element and holding members may be divided into one of a number of sections, and e) a means for joining said dynamic holding member to said base element, f) wherein said dynamic holding members are pivotally mounted about said base elements thereby effectively locking or unlocking the corners of said planar articles, and g) whereby a plurality of said planar articles can be retrieved or secured when the plurality of base elements are arranged adjointly on said wall surface.

2. The machine of claim 1 wherein said base element or said holding members are made of polymethyl methacrylate (PMMA).

3. The adaptable mounting system of claim 1 wherein said base element or said holding members are made of wood.

4. The adaptable mounting system of claim 1 wherein said base element or said holding members are made of metal.

5. The adaptable mounting system of claim 1 with a magnetic means applied to said base element for joining to a magnetic substrate.

6. The adaptable mounting system of claim 1 with string, wire, or filament connecting the base elements to a wall surface and adjacent base elements to collectively hang a plurality of base elements.

* * * * *